P. A. WOOD.
TRUCK.
APPLICATION FILED NOV. 25, 1911.
1,033,141.
Patented July 23, 1912.
3 SHEETS—SHEET 2.
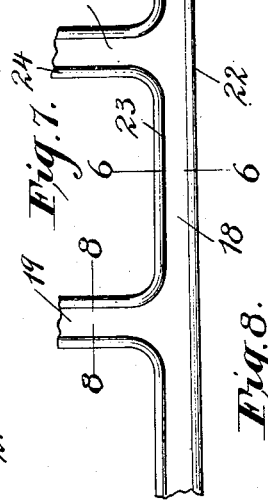
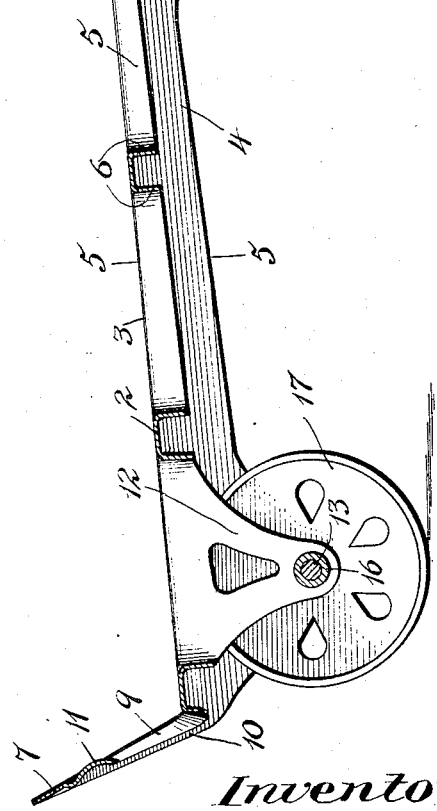
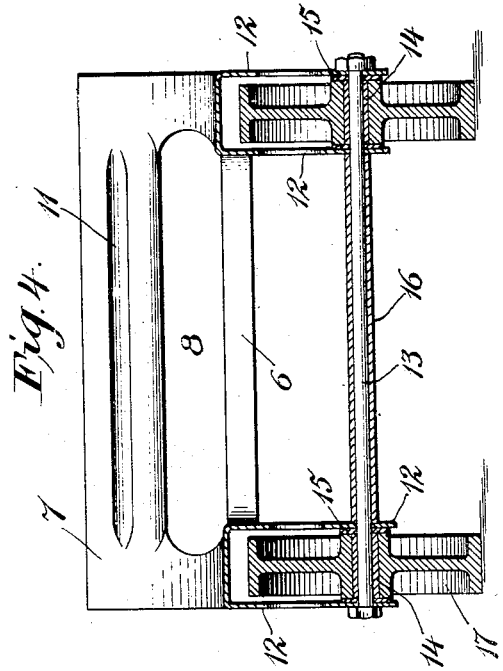
Witnesses:
J. A. Braddock
M. E. Jones
Inventor:
Pinckney A. Wood,
by H. H. Doolittle
Attorney.

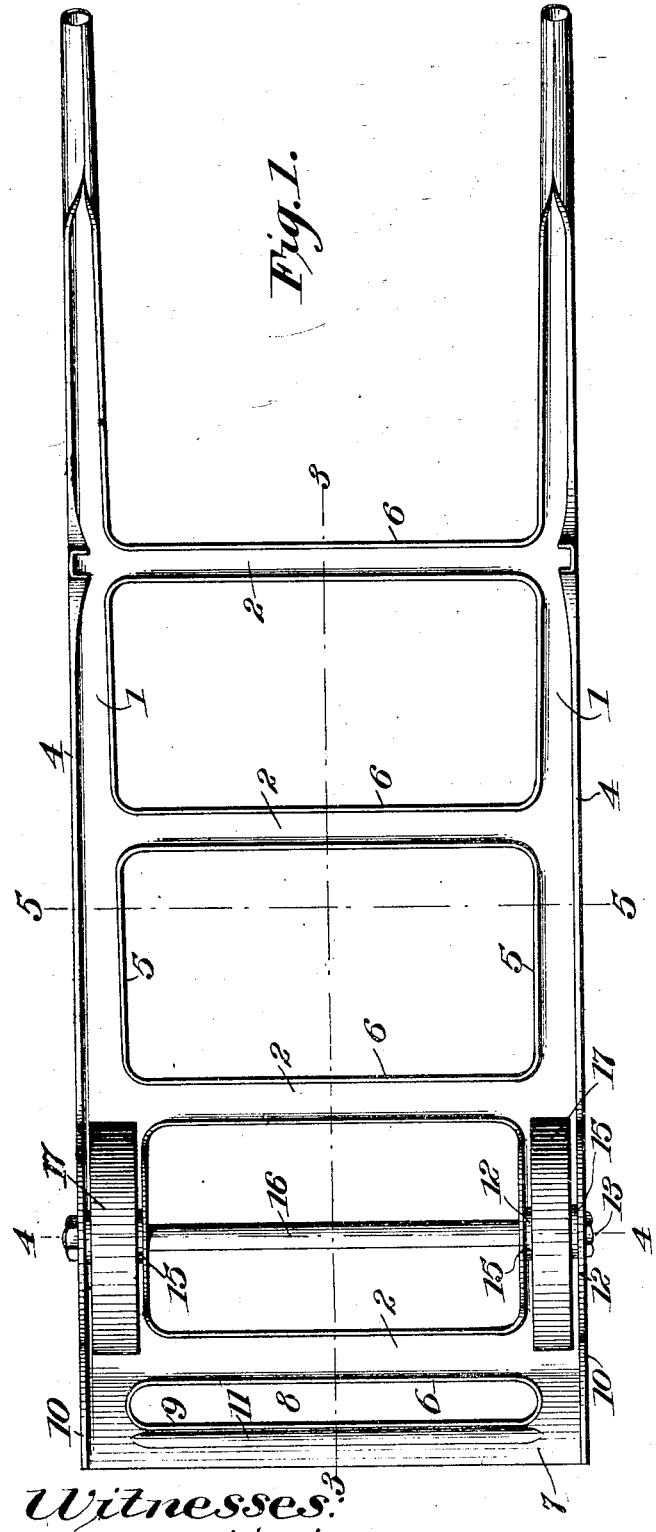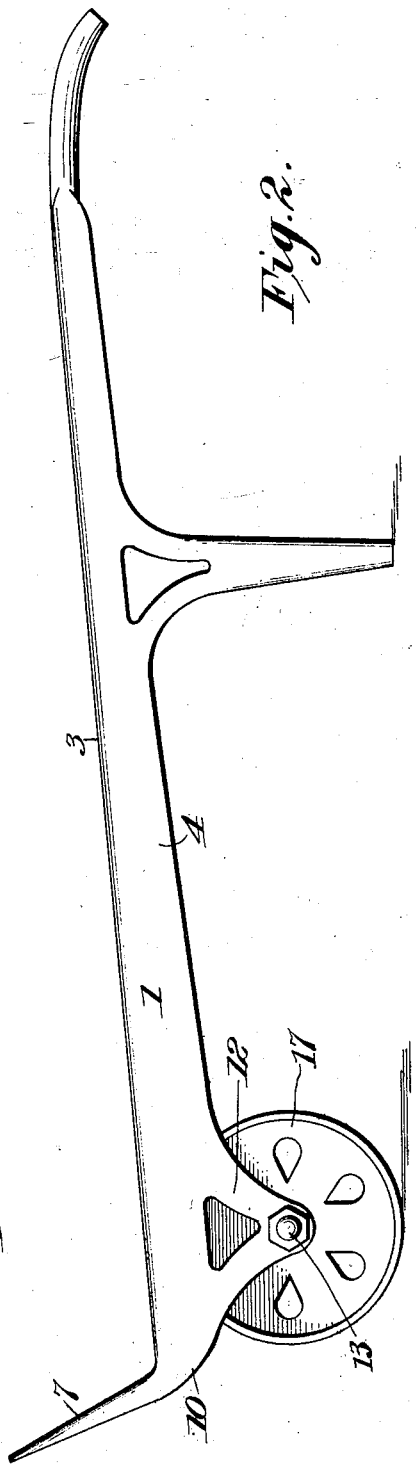

P. A. WOOD.
TRUCK.
APPLICATION FILED NOV. 25, 1911.

1,033,141.

Patented July 23, 1912.
3 SHEETS—SHEET 3.

Witnesses:
J. A. Braddock
M. E. Jones

Inventor:
Pinckney A. Wood,
by H. Doolittle,
Attorney.

UNITED STATES PATENT OFFICE.

PINCKNEY A. WOOD, OF MEMPHIS, TENNESSEE, ASSIGNOR TO PRESSED STEEL TRUCK COMPANY, OF PITTSBURGH, PENNSYLVANIA, A CORPORATION OF WEST VIRGINIA.

TRUCK.

1,033,141.     Specification of Letters Patent.     Patented July 23, 1912.

Application filed November 25, 1911. Serial No. 662,316.

*To all whom it may concern:*

Be it known that I, PINCKNEY A. WOOD, a citizen of the United States, residing at Memphis, in the county of Shelby and State of Tennessee, have invented certain new and useful Improvements in Trucks, of which the following is a specification.

My invention relates to trucks and its object is to provide a truck of great strength and durability and of such construction that it may be rapidly and cheaply manufactured.

To these ends the invention comprises a truck having a body portion made of an integral piece of pressed steel provided with flanges along its edges to impart rigidity to the body structure and so formed as to obtain this advantage and add strength to the metal, a lifting nose integral with the body structure and so constructed as to enable the same to readily engage articles to be carried on the truck and possessing the necessary strength and rigidity, means coöperating with the integral construction and providing for such a distribution of the weight as will enable the truck to be maintained in upright position when tilted upward to rest upon its nose piece, means integral with the body structure for supporting the wheels of the truck and the axle therefor in association with a construction of axle and spacing and binding members adapted to secure and maintain rigidity of the said supporting means and such a construction of the parts of the truck as to avoid the use of rivets, bolts or screws as fastening means.

The invention also comprises in addition to the above features means associated with the integral body structure for the convenient attachment of a strong and rigid connection without the use of rivets or bolts or screws of wooden handles to the truck and also for the similar attachment of metal legs.

My invention is embodied in preferable form in the truck hereinafter described and illustrated in the accompanying drawings.

Figure 10:
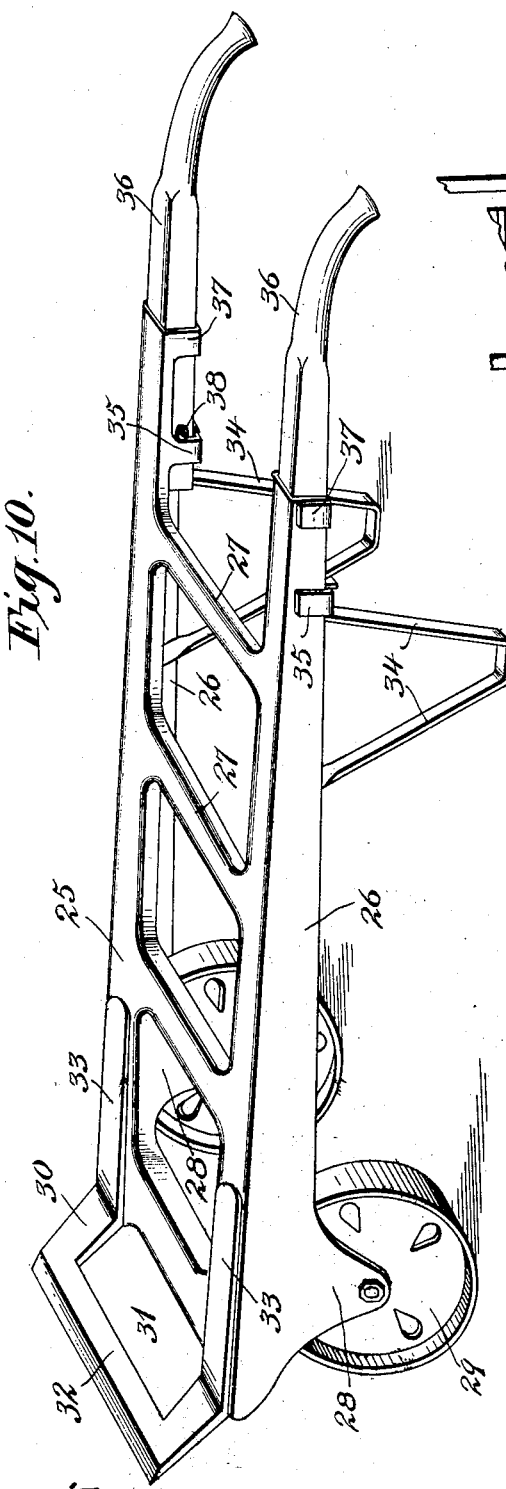
Figure 9:
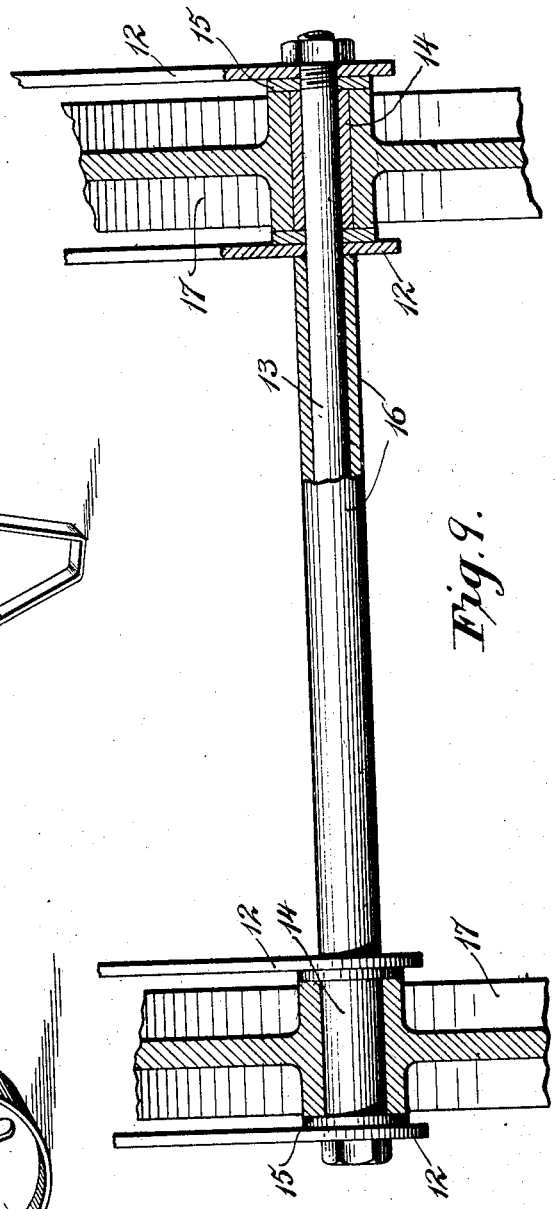

In these drawings, Figure 1 is a bottom plan view of a truck embodying most of the features above enumerated; Fig. 2 is a side view in elevation of the truck shown in Fig. 1; Fig. 3 is a longitudinal section on the line 3—3 of Fig. 1; Fig. 4 is a transverse section on the line 4—4 of Fig. 1; Fig. 5 is a transverse section on the line 5—5 of Fig. 1; Fig. 6 is a view similar to Fig. 5 showing a modified form of the flanged side bars and cross bars; Fig. 7 is a detail plan view, broken away, of the modified form of side bars and cross bars shown in Fig. 6; Fig. 8 is a sectional view taken on line 8—8 of Fig. 7; Fig. 9 is an enlarged detail view partly in elevation and partly in vertical cross section taken through the wheels and wheel carrying means; Fig. 10 is a perspective view of a modified form of truck showing the nose piece made integral with the body structure by means of welding and showing the wooden handles, legs and their connection to the body structure above referred to.

Referring to the drawings and first to the features embodied in Figs. 1, 2, 3, 4, 5 and 9, the truck comprises a body portion or frame formed of an integral piece of pressed steel and consisting primarily of longitudinal side bars 1, 1 and integral channeled cross bars 2. Each side bar has a bearing face 3, an outer depending flange 4 and an inner depending flange 5. The cross bars are provided along their edges with depending flanges 6 which join the inner depending flanges 5 of the side bars. The inner flanges 5 are of less depth than the outer flanges and merely of sufficient strength to provide rigidity for the inner edges. It will be seen that the inner and outer flanges thus formed provide a side bar 7-shaped in cross section. The side bars taper from the nose end to the carrying end for the purpose of providing a greater weight at the former end. The cross bars 2 successively increase in depth of flange and in cross sectional area from the handle end to the nose end as shown in the drawings, particularly in Figs. 1 and 3 for the purpose of greatly increasing the weight at the nose end, which tends to balance the truck on the axle, providing in a convenient and simple manner in the one piece body portion such a distribution of the weight as will enable the truck to be maintained in upright position when tilted forward upon the under side of the nose piece. Extending upwardly and angularly from the forward end of the body structure is an integral nose piece 7. This nose piece has a transverse opening 8 and is provided along the edge of such opening with a downwardly projecting integral strengthening flange 9. This flange joins the forward depending flange 6 of the front cross bar. The side edges of the nose piece 7 are also provided with downwardly extending flanges 10 which join and form continuations of the longitudinal outer flanges of the side bars 4. The nose piece is also provided with a transverse depressed strengthening bead 11. The opening in the nose piece affords a means of engagement with the edge of a box, barrel or package and the strengthening flanges around the edges of the nose piece together with the bead 11 so increase the rigidity of the nose piece as to render the sheet metal of sufficient strength to lift heavy loads.

The legs of the truck may be of the form shown in Figs. 1, 2 and 3, inclusive, in which they consist of depending members integral with the outer flanges of the side bars and provided with inwardly projecting flanges along their vertical edges which flanges gradually merge into the outer flanges of the side bars.

Formed integral with the outer and inner flanges of each side bar are depending axle and wheel bracket members consisting of two pairs of ears 12. These ears are provided with apertures of a size merely sufficient to admit therethrough a rigid, non-rotatable axle 13 extending across the truck and through all of the ears. Mounted on the axle between the ears of each bar is a spacing and bearing member consisting of a removable sleeve or bushing 14 which is adapted to hold the ears properly spaced to prevent inward bending of the latter under any strain exerted thereon. Between each end of this spacing and bearing member and the adjacent ear is mounted on the axle a wearing washer 15. Between the inner ears of the opposite pairs is a central spacing member consisting of a removable sleeve 16, the ends of which are adapted to abut against the inner surfaces of said ears and thereby hold them rigidly spaced apart and in the proper position. The ends of the axle 13 are provided with suitable clamping means which may consist of screw threads on the axle and clamping nuts adapted to engage the screw threads and be forced against the outer ears. Mounted on each of the spacing and bearing members 14 so as to revolve thereon is a wheel 17. When the nuts are screwed up the ears, sleeves and washers will all be tightly clamped together. It will thus be seen that the axle and spacing members and clamping means coöperate with the integral sheet metal ears to enable them to serve as axle brackets and wheel housings without the use of additional braces riveted or otherwise attached to the body structure. The sleeves, washers and axles are all readily removable and may therefore be easily removed when any of such parts become worn or need renewing.

The wheels are completely housed within the depending integral ears and are thus confined within a vertical plane of the outer edge of the side bars, thus serving to protect bags or packages on the truck from coming in contact with the wheels.

In Figs. 6, 7 and 8, a flanged and beaded construction for the side bars and cross bars is shown in which 18 are the side bars and 19 the cross bars. The former are provided with inner and outer depending flanges 20 and 21 and on their upper surfaces with inner and outer raised beads 22 and 23. The latter beads merge into beads 24 formed on the edges of the cross bars. The beading in this form of device serves to increase the strength of the bars.

In Fig. 10, a truck is shown which embodies certain features comprised in my invention and additional to those already described. In this device, 25 is the body portion having side bars 26 and cross bars 27 which are of the same construction as described with reference to Figs. 1 to 5 and 9, inclusive. The side bars are provided with depending integral ears 28 in which are housed wheels 29. A nose piece 30 having an opening 31 and a cross bar 32 is made integral with the body structure by welding the arms 33 of said nose piece upon the upper surface of the side bars 25. In this form of truck, legs 34 made of separate pieces of metal are provided, the forward ends of which are fastened to the inner surfaces of the side bars 26 and the rear ends of which are provided with hooked shoulders adapted to pass through eye members 35 depending from the flanges of the side bars and welded to the outer flanges of the side bars. Adapted to pass through these eye members and bear upon the upper ends of the hooked legs are wedge shaped wooden handles 36. In addition to the metal strips or eye members described similar rearward strips 37 are provided through which the handle bars also pass. By means of the wedge shape of the handles and the engagement of the same with the flanges and eye members of the side bars the handles may be driven primarily into place and rigidly secured to the side bars. In order to prevent forward movement of the handles, a screw nail or the like such as 38 may be screwed into each handle bar to the rear of the forward eye members.

It will be seen that the above construction not only provides a truck of great strength and durability but also avoids the use of rivets, bolts or similar fastening means, which fastening means are objectionable owing to the fact that they become rusted and the metal thereof oxidized which will tend to eat away the metal and owing to the violent shocks and jars to which a truck is subjected the oxid or rust will sift or shake out from around the rivets or bolts and soon result in the loosening and breaking of the fastening means. Rivets and bolts therefore are objectionable in this class of devices and by my construction their use as fastening means is entirely obviated.

In the truck shown in Figs. 1, 2 and 3, metal handles integral with the longitudinal side bars are provided but preferably wooden handles such as are shown in Fig. 10 are employed in connection with such truck.

Having thus described my invention, what I claim is:—

1. In a truck, a body portion made of one piece of sheet metal and having channeled cross bars successively increasing in cross sectional area from the handle end of the truck toward the opposite end.

2. In a truck, a frame comprising longitudinal side bars having handles at one end thereof and cross-bars connecting said side bars, said cross-bars increasing in cross-sectional area from the handle end of the truck toward the opposite end thereof.

3. In a truck, a body portion of pressed sheet metal in one piece, comprising channeled cross bars successively increasing in cross sectional area and depth of channel from the rear or handle end toward the opposite or forward end, and longitudinal side bars having flanges prolonged into depending ears near the forward end, providing wheel housings and axle brackets.

4. In a truck, metallic side bars, said bars having depending flanges and members forming eyes and wooden handles engaging said bars and passing through said eyes, said handles being wedge-shaped to hold the same against movement in one direction and stop means to prevent the movement of the handles in the opposite direction.

5. In a truck having members forming eyes, legs having shoulders engaging said eye members and wedge-shaped wooden handles passing through said eyes and securing the shoulder portions in place.

6. In a truck, a body portion of sheet metal provided with side bars, said side bars each having integral depending inner and outer flanges, and integral axle brackets prolonged downwardly from the inner and outer flanges and providing wheel housings.

7. In a truck, a body portion of sheet metal provided with side bars having depending vertical flanges on the inner and outer edges thereof, the flanges on each bar being prolonged into depending ears, an axle extending across the truck and passing through the two pairs of ears and a spacing and brace member mounted on said axle between the inner ears of each pair.

8. In a truck, a metal body portion provided with opposite pairs of depending axle bracket members, an axle mounted in said bracket members, a spacing member between the inner bracket members of each pair and a spacing member between the bracket members of each pair and a wheel journaled on each of the latter spacing members and housed between the said axle bracket members of each pair.

9. In a truck, a metal body portion provided with opposite pairs of depending axle bracket members, an axle extending through the members of both pairs, a spacing member between the bracket members of each pair, a spacing member between the inner bracket members of the opposite pairs, a wheel journaled and housed between the members of each pair and means in connection with said axle to clamp said spacing members against said bracket members, substantially as described.

10. In a truck, a metal body portion provided with opposite pairs of depending axle bracket members, an axle passing through said members, a removable spacing and bearing sleeve between the members of the opposite pairs, means in connection with said axle to clamp said spacing and bearing members between said bracket members.

11. In a truck, two pairs of depending brackets, an axle passing through said brackets, spacing and bearing sleeves between the brackets of each pair, wheels on said sleeves, a spacing sleeve between the adjacent inner brackets of the pairs and means in connection with said axle for clamping the said brackets and sleeves together, whereby the brackets are braced, substantially as described.

12. In a truck, a metal body portion provided with opposite pairs of depending axle bracket members, an axle removably mounted in said members, a removable spacing and bearing sleeve between the members of each pair, a removable spacing sleeve between the inner bracket members of the opposite pairs, a wheel journaled on each of said bearing members between the bracket members, wearing washers between said wheels and bracket members and means in connection with said axle to clamp the spacing and bearing members against the bracket members.

13. In a truck, a body portion made of a single piece of pressed steel and having integral therewith a nose piece having an opening therein, and a flange projecting downwardly from the edge surrounding said opening, and a strengthening bead formed in the forward portion of said nose.

14. In a truck, a body portion of sheet metal having integral side bars provided with depending integral flanges, opposite pairs of integral ears depending from the flanges, an open nose piece integral with the body and having downwardly projecting flanges along its inner and outer edges and having a strengthening bead thereon.

In testimony whereof I have affixed my signature in presence of two witnesses.

PINCKNEY A. WOOD.

Witnesses:
M. E. JONES, Jr.,
T. A. BRADDOCK.